United States Patent [19]

Konishi et al.

[11] Patent Number: 4,534,639
[45] Date of Patent: Aug. 13, 1985

[54] CAMERA HAVING AN EXPOSURE MODE CHANGE-OVER DEVICE

[75] Inventors: Yuichiro Konishi, Tokyo; Tokuichi Tsunekawa; Hiromi Someya, both of Kanagawa, all of Japan

[73] Assignee: Canon Kabushiki Kaisha, Tokyo, Japan

[21] Appl. No.: 561,641

[22] Filed: Dec. 15, 1983

[30] Foreign Application Priority Data

Dec. 21, 1982 [JP] Japan .................................. 57-224381
Dec. 21, 1982 [JP] Japan .................................. 57-224382

[51] Int. Cl.$^3$ ........................ G03B 7/099; G03B 17/20
[52] U.S. Cl. .................................. 354/432; 354/443; 354/474; 354/478; 354/481
[58] Field of Search ................ 354/412, 471, 429-434, 354/478, 481, 199-201, 219, 474, 289.1, 475, 440-442, 418, 459, 443, 472

[56] References Cited

U.S. PATENT DOCUMENTS 3,903,529 9/1975 Sorimachi et al. ................... 354/440
4,016,575 4/1977 Uchiyama et al. ................... 354/418

FOREIGN PATENT DOCUMENTS 0161221 12/1980 Japan .................................... 354/219

Primary Examiner—William B. Perkey
Attorney, Agent, or Firm—Toren, McGeady, Stanger, Goldbert & Kiel

[57] ABSTRACT

A camera has a light measuring mode setting circuit set according to an exposure mode change-over operation a change-over circuit for a light measuring range is switched over according to the setting of the light measuring mode setting circuit. Thus a light measuring mode of the camera suited for the set exposure mode can be selected according to the setting of the exposure mode.

5 Claims, 6 Drawing Figures

CAMERA HAVING AN EXPOSURE MODE CHANGE-OVER DEVICE

BACKGROUND OF THE INVENTION

1. Field of the Invention:

The present invention relates to a camera having an exposure mode change-over device which makes a change-over of a light measuring according to a change-over of an exposure mode.

2. Description of the Prior Art:

Heretofore, an exposure mode change-over device allows change-overs to a disphragm preference mode, a shutter preference mode, and a program mode, and especially recently, a program mode comprises many different kinds such as a shutter preference magic mode, a diaphragm preference magic mode, etc.

Also, concerning a light measuring system, a photographer can choose what he wants from a center-weighted light measuring, an averaged light measuring, a locally-weighted light measuring, and a spot light measuring, thus a photographer can enjoy great conveniences.

However, while such mode change-overs provide great conveniences, on the other hand, a beginner will find the same as merely complications in handling, thus there have been many cases where a photographer does not know how to use it, resulting in erroneous uses.

SUMMARY OF THE INVENTION

An object of the present invention is to eliminate the above shortcomings, and is to provide a camera having an exposure mode change-over device which can allow a selection of such light measuring mode of a camera as suited for a set exposure mode as such mode is selected.

Other objects of the present invention shall be made clear by specific embodiments which shall be explained below.

DESCRIPTION OF THE PREFERRED EMBODIMENTS

Figure 1:
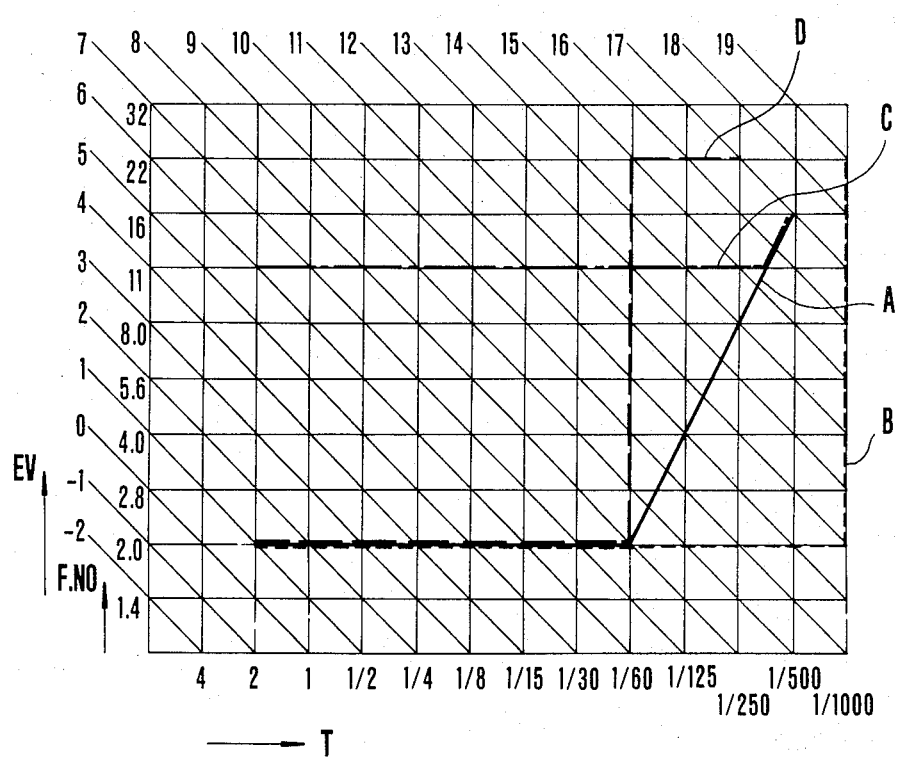
FIG. 1 is a program line diagram for each exposure mode of a camera according to the present invention.

Now, explanations shall be made on an embodiment of the present invention referring to the drawings. FIG. 1 shows programmed combinations of shutter speed and aperture at each exposure mode of a camera, wherein the perpendicular axis shows an aperture value (F NO.), and transverse axis shows a shutter time (T), while oblique axis shows EV values. What is shown as A is a normal program exposure control line and is called as a normal mode. What is shown as B has a fully opened F value of a taking lens of F 2 and has a shutter speed changed depending on an object brightness along the transverse axis up to 1/1000 second according to an object brightness, wherein an aperture value changes at 1/1000 second. At F 2, a picture with shallow depth of field will be obtained, being fitted for a photographing of a model, thus being called as a shallow focus mode. Also, a zone at which an aperture changes from 1/1000 second is suitable for a quickly moving object, thus being called as a stop motion mode. Also, C represents a diaphragm preference program with an aperture F 11. That is, a shutter speed changes at F 11, and a normal mode will be obtained at an area where EV value is larger than a point at which it crosses the line of the normal mode. An image at such a case will bring out a picture with a deep depth of field as the aperture value is F 11. Thus is called as a pan focus mode. What is shown as D has a shutter speed changed in the beginning with a diaphragm preference mode of F 2, but the aperture value changes from 1/60 with a shutter preference mode, then at F 22 the shutter speed changes and becomes faster. An image in such a case can bring out a streamy picture, allowing a panning photo-taking when a speedy object is photographed. This is called as a panning shot mode.

It was studied as to what photo-sensing mode is best suited for each one of the exposure modes with the following results in the present invention.

Since an ordinary photographing is done in the normal mode of A, the averaged light measuring is suited therefor.

In the shallow focus mode or the stop motion mode, B, the main object is positioned in the center of a view finder field of vision while the peripheral portions of the view finder field of vision are made inconspicuous. Therefore the locally weighted light measuring is suited.

In the pan focus mode C, it is necessary to have an in-focus state uniformly for the entire image plane and to secure an average exposure for the entire picture plane without stressing any portion of a video image, thus the averaged light measuring is suited therefor.

In the panning shot mode, D, a photo-taking art so-called panning is used. Therefore, since the camera is ordinarily swung laterally, the light measuring in a lateral belt manner is suited here.

Figure 2:
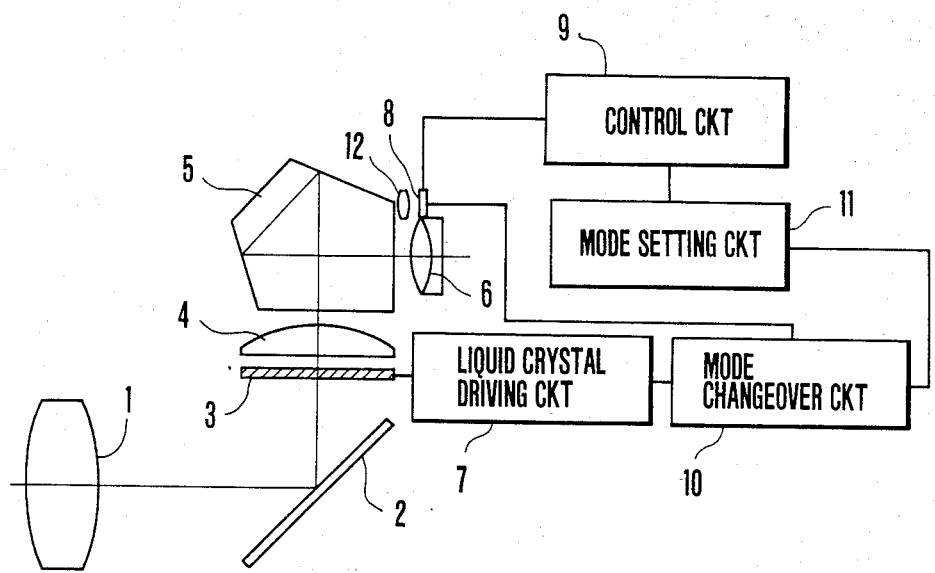
FIG. 2 is an optical arrangement drawing of a camera showing an embodiment of the present invention.
Figure 3:
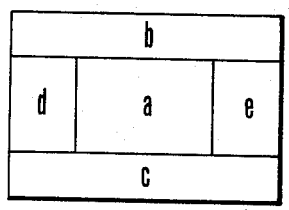
FIG. 3 is an illustration for the liquid crystal focus plate shown in FIG. 2.

Now, FIG. 2 shows an optical arrangement of a camera, wherein 1 is a taking lens, 2 is a movable mirror, 3 is a focus plate, 4 is a condenser lens, 5 is a pentagonal prism, 6 is an eye-piece lens. Therefore, light beam passing through the taking lens 1 will be reflected by the mirror 2 and will go through the focus plate 3, and the condenser lens 4, then will be reflected at the pentagonal prism 5, so that the image therefrom can be visually recognized by the eye-piece lens 6. The focus plate 3 is an electrical-optical diffusion plate, and is made of liquid crystal. Then it is divided into suitable patterns as shown in FIG. 3, wherein each one of the divided sections of the pattern can have a voltage impressed thereonto individually by a respectively separate electrode. Such arrangement is provided there that each section thereof will have its density changed as a pulse voltage is impressed thereonto. What is shown as 7 is a liquid crystal driving circuit, and 8 is a light receiving element. What is shown as 12 is a condenser lens placed in front of the light receiving element. For example, the voltage at a section marked "a" of the focus plate 3 in FIG. 3 is lowered to increase the transparency and the voltages at other sections are increased to lower the transparency thereat, then the locally weighted light measuring to measure light at the portion "a" will be made at the light receiving element 8.

Therefore the locally weighted light measuring will be made in the shallow focus mode and the stop motion mode.

Further, when the entire surface of the focus plate 3 of FIG. 3 is made to have uniform intensity of illuminataion, an averaged light measuring will be made. The averaged light measuring is made in a normal mode and a pan-focus mode.

Also, when the transparency at the sections, "d", "a", "e" of the focus plate 3 is enhanced and the transparency at other sections is lowered, a belt shaped light measuring will be made and in a case of a panning shot mode, the belt shaped light measuring is made. What is shown as 9 is a control circuit that receives an output of the light receiving element 8. By forming the shapes of the patterns at the light receiving element 8 as similar to those of the liquid crystal patterns at the light measuring part, a display of a light measuring range can be made. What is shown as 10 is a mode change-over circuit, and 11 is a mode setting circuit.

Figure 4:
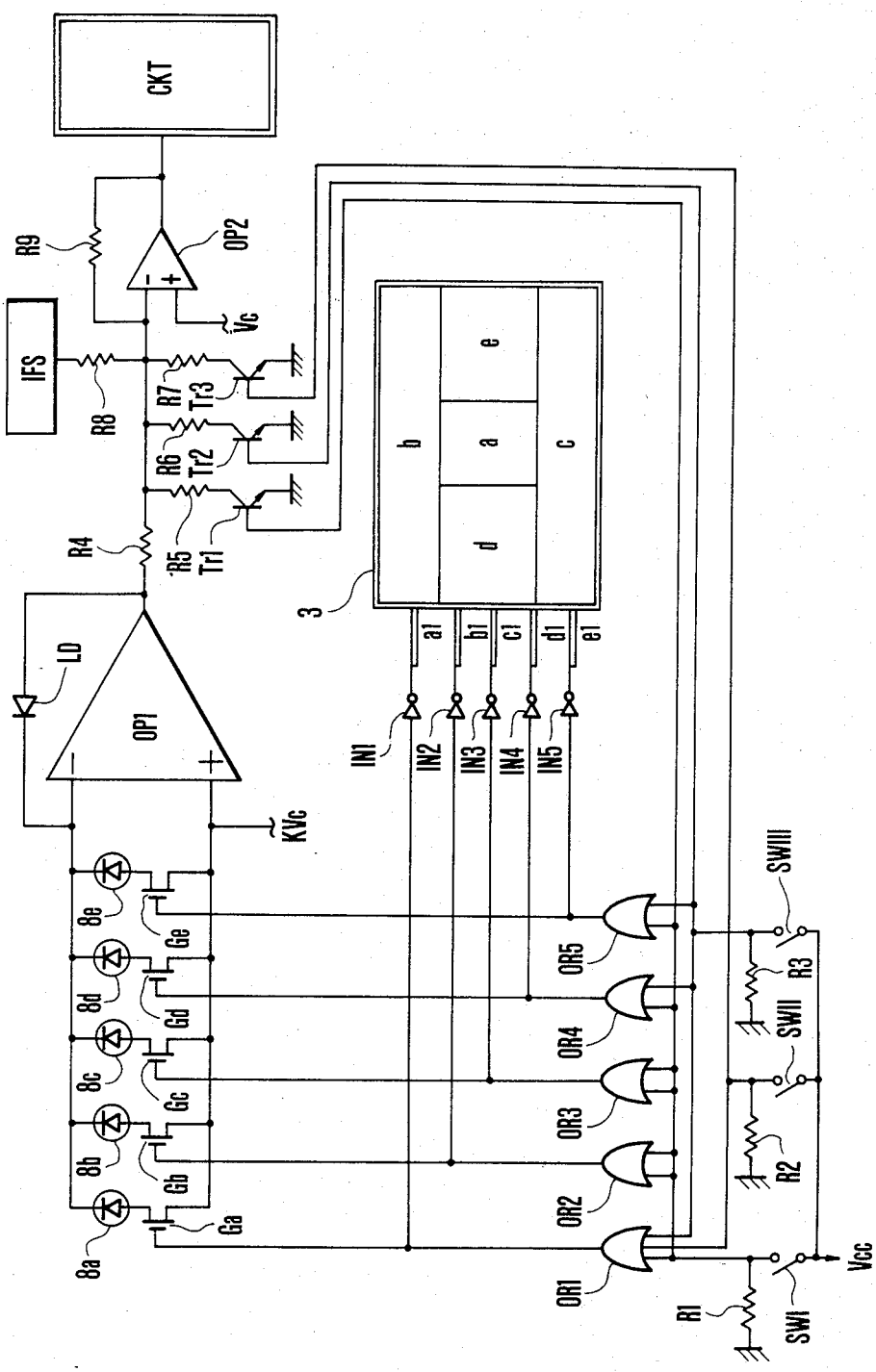
FIG. 4 is a control circuit diagram of the camera shown in FIG. 2.

FIG. 4 shows driving circuits for the light receiving element 8 and the liquid crystal focus plate 3 when the shapes of the liquid crystal pattern displaying the light measuring part of the focus plate 3 are made similar to those of the pattern of the light receiving element 8 (8a, 8b, 8c, 8d, 8e). Since the pattern shape of the light receiving element 8 and the shape of light measuring display pattern of the liquid crystal focus plate 3 are similar to each other, the light measuring part can be indicated by slight difference in density of the liquid crystal of the focus plate, thus there will be no difficulty in viewing the focus plate. The light receiving element 8 is divided in correspondence to the light measuring part pattern ("a" to "e") of the focus plate 3, wherein Ga to Ge are analog gates for changing over the light receiving element, and CD is a logarithmically compressing diode for logarithmically compressing photo-current of the light receiving element, while OP1 is a high input impedance operational amplifier for light measuring, wherein such light measuring information as logarithmically compressing photo-current generated from the light receiving element 8 will be generated at the output terminal of the operational amplifier, OP1. The light measuring information and information set by an exposure information setting circuit IFS as well as exposure level correction information will be operated at the operational amplifier OP2 through operational resistances R4 to R9. The outputs of the operational amplifier OP2 are added to a known type of an exposure control circuit CKT, and a control of exposure will be made. What are shown as Tr1 to Tr3 are switching transistors for inputting exposure level correction information, and are changed over in association with the exposure mode setting. What are shown as KVc, Vc are reference power sources, and Vcc is a power source voltage. What are shown as SWI, SWII, SWIII are switches associated with an exposure mode setting member (not shown), wherein the SWI is a switch becoming ON at times of a normal mode and a pan-focus mode, the SWII is a switch becoming ON at the time of a shallow focus mode and a stop motion mode, and SWIII is a switch becoming ON at the time of a panning shot mode. The light receiving element and the liquid crystal pattern are selected through pull-down resistances R1 to R3, OR gates OR1 to OR5, and inverters IN1 to IN5. Electrodes corresponding to the liquid crystal patterns "a" to "e" of the focus plate 3 are represented by "a1" to "e1", wherein the arrangement is such that when high voltage is impressed on the electrodes "a1" to "e1", the incident light beam will be diffused, this lowering the transparency.

Next operations of the above arrangement will be explained.

(1) When the exposure mode setting member (not shown) is set at the normal mode or the pan-focus mode, the switch SWI is made ON, while the switches SWII and SWIII are left in OFF state. As the switch SWI is made ON, the power source voltage Vcc will be added to the OR gates OR1 to OR5 and the transistor Tr1. Therefore, at the same time the transistor Tr1 is turned ON, the outputs of the OR gates OR1 to OR5 assume respective high levels. Since the high level signals of OR gates OR1 to OR5 are added to the inverters IN1 to IN5, a high voltage will not be impressed on the liquid crystal focus plate 3, therefore the liquid crystal focus plate 3 will be transparent on its entire plane, indicating a total plane light measuring. At the same time the high level signals of the OR gates OR1 to OR5 will place all of the analog gates Ga to Ge in ON state and the light measuring will be made on the total plane with the light receiving elements 8a to 8e. Such light measuring information as logarithmically compressing the photo-current generated by the light receiving elements 8a to 8e will be produced from the output terminal of the operational amplifier OP1. The light measuring information from the operational amplifier OP1 and information set by the exposure information setting circuit IFS will be operated at the operational amplifier OP2 through exposure level correction resistances R4, R5, R8 and R9. Outputs of the operational amplifier OP2 will be added to the exposure control circuit CKT, and the circuit CKT makes an exposure control based on the outputs of the operational amplifier OP2.

(2) When the exposure mode setting member (not shown) is set in the shallow focus mode, or the stop motion mode, the switch SWII is made ON, while the switches SWI and SWIII are left in OFF state. As the switch SWII is made ON, the power source voltage Vcc is added to the OR gate OR1 and the transistor Tr3. Therefore, the transistor Tr3 is made ON, and at the same time only the output of the OR gate OR1 becomes to have a high level. Since the high level signal of the OR gate OR1 is added to the inverter IN1, a high voltage will be impressed on the terminals b1, c1, d1, e1 of the liquid crystal focus plate 3, lowering the transparency of the sections b, c, d, e, of the liquid crystal focus plate 3, and a low voltage is impressed only on the terminal "a" of the liquid crystal focus plate 3, and the section "a" of the liquid crystal focus plate 3 will become transparent, indicating that a locally weighted light measurement is being made. At the same time, the high level signal of the OR gate OR1 places the analog gate Ga in ON state and the light measuring will be made by the light receiving element 8a. Such light measuring information as a logarithmically compressing photo-current generated from the light receiving element 8a will be produced out of the output terminal of the operational amplifier OP1. The light measuring information from the operational amplifier OP1 and information set by the exposure information setting circuit IFS will be operated at the operational amplifier OP2 through the exposure level correction resistances R4, R7, R8, R9. An output of the operational amplifier OP2 is added to the exposure control circuit CKT, and the circuit CKT makes an exposure control based on the output of the operational amplifier OP2.

(3) When the exposure mode setting member (not shown) is set in a panning shot mode, the switch SWIII is made ON, while the switches SWI and SWII are left in OFF state. As the switch SWIII is made ON, the power source voltage Vcc will be added to the OR gates OR1, OR4, OR5, and the transistor Tr2. Therefore, the transistor Tr2 becomes ON and at the same time the outputs of the OR gates OR1, OR4, OR5 become to have a high level. Since the high level signals of the OR gates OR1, OR4, OR5 are added to the inverters IN1, IN4, IN5, a high voltage will be impressed on the terminals b1, c1 of the liquid crystal focus plate 3, thus a transparency of the sections "b", "c" of the liquid crystal focus plate 3 will be lowered. The high voltage will not be impressed on the terminals a1, d1, e1 of the liquid crystal focus plate 3 and the sections "a", "d", "e" of the liquid crystal focus plate 3 will be transparent, thus indicating that a belt shape light measurement is being made. At the same time, the high level signals of the OR gates OR1, OR4, OR5 will place the analog gates Ga, Gd, Ge in ON state, and the light measuring will be made on a central belt shaped zone at the light receiving elements 8a, 8d, 8e. Such light measuring information as logarithmically compressing photo-current generated from the light receiving elements 8a, 8d, 8e is produced out of the output terminal of the operational amplifier OP1. The light measuring information from the operational amplifier OP1 and information set by the exposure information setting circuit IFS will be operated by the operational amplifier OP2 through the exposure level correction resistances R4, R6, R8, R9. An output of the operational amplifier OP2 is added to the exposure control circuit CKT, and the circuit CKT makes an exposure control based on the output of the operational amplifier OP2.

Figure 5:
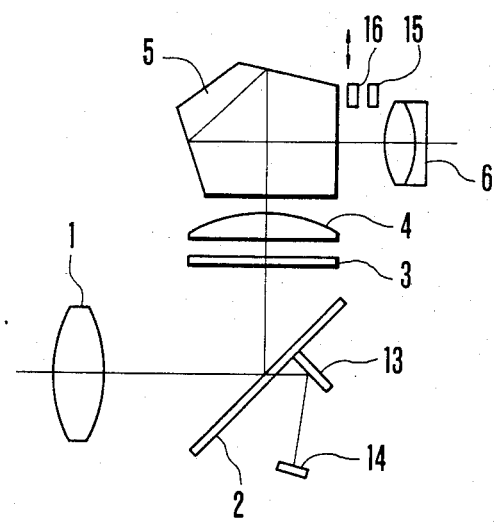
FIG. 5 is an optical arrangement drawing of a camera showing another embodiment of the present invention.
Figure 6:
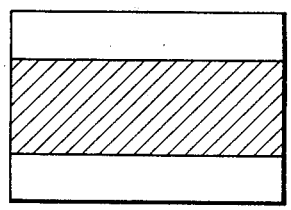
FIG. 6 is an illustration to show a light measuring range in the case of a band shape light measuring of the camera shown in FIG. 5.

In place of the liquid crystal focus plate in the above embodiment, the light beam passing through a partial penetrating part of the mirror 2 may be reflected by a sub-mirror 13 are shown in FIG. 5 as means of light measuring change-over, and the light beam is guided to a light receiving element 14 for making a locally weighted light measuring, also a cylindrical lens 16 which shrinks an image in an up and down direction is positioned in the rear of the pentagonal prism 5 and in front of a light receiving element 15, so that an averaged light measuring will be made when the cylindrical lens 16 is placed outside of the optical path and the light measuring of belt shape as shown in FIG. 6 will be made when the lens 16 is placed in the optical path. When these elements are changed over in association with the exposure mode setting member, the light measuring change-over can be achieved corresponding to the exposure mode. Also if the exposure mode is displayed with a picture as in Japanese Laid-Open patent application No. SHO 57-78033, the selection of multi-modes as in the present invention can be made easily understandable, improving operating characteristics. Further, when the light measuring system can be manually selected, it is also possible to provide warnings or to effect prohibitions in such manner that at the time of a shallow focus mode or a stop motion mode no other light measuring than the locally weighted light measuring can be selected, also at the time of a normal mode and a pan-focus mode no other light measuring than an averaged light measuring can be selected, further, at the time of a panning shot mode, no other light sensing than a belt shape light sensing can be selected.

As has been explained in detail, according to the present invention such advantages are provided that depending on a set exposure mode, a suitable light measuring mode of the camera for the set exposure mode can be selected so that necessity to work out a light measuring mode suited for an exposure mode can be eliminated, thus an unskilled photographer can make a photo-taking without difficulty.

Furthermore, a belt shape light measuring which has never been done before can be made and said belt shaped light measuring is used as a light measuring mode suited for a panning shot mode. Therefore, a light measuring at a panning shot mode can be made in a very precise manner.

What we claim is:

1. A single lens reflex camera having an exposure mode change-over device which can select one exposure mode out of a variety of exposure modes, comprising:

a photo-taking lens;
a focus plate on which object light beam from the photo-taking lens is imaged, said focus plate being formed by an electrical optical element divided into a plurality of sections;
a light receiving element to measure the object light beam from a transmitting part of said focus plate;
a plurality of switches corresponding to said various exposure modes; and
a circuit to control density of each section of said electrical optical element depending on the switching action of the plurality of switches, said circuit controlling the density of each section of said electrical optical element so as to select a light measuring mode corresponding to a set exposure mode.

2. A camera according to claim 1, wherein said electrical optical element is a liquid crystal divided into plurality of patterns.

3. A camera according to claim 1, wherein the variety of exposure modes are a plurality of program modes.

4. A single lens reflex camera having an exposure change-over device which can select one exposure mode out of a variety of exposure modes, comprising:

a photo-taking lens;
a focus plate on which object light beam from the photo-taking lens is imaged, said focus plate being formed with an electrical optical element divided into a plurality of sections;
a light receiving element to measure object light beam from a transmitting part of said focus plate said light receiving element being formed into a plurality of sections having shapes similar to the plurality of sections of said electrical optical element;
a plurality of switches corresponding to the variety of exposure modes; and
a circuit for controlling the density of individual sections of said electrical optical element and selecting individual sections of said light receiving element so as to select a light measuring mode corresponding to a preset exposure mode.

5. A single lens reflex camera having an exposure mode change-over device which can select one exposure mode out of a variety of exposure modes, comprising:

a photo-taking lens;

a focus plate arranged to have object light beams from the photo-taking lens imaged thereon, said focus plate having an electrical optical element divided into a plurality of sections;

a light receiving element to measure object light beam passing through said focus plate;

a signal generating circuit for selecting one exposure mode out of various exposure modes and generating a signal according to the selected exposure mode;

a control circuit for controlling the density of each section of said electrical optical element according to the signal generated from said signal generating circuit so as to select a light measuring mode corresponding to a set exposure mode.

* * * * *